(12) United States Patent
Christ et al.

(10) Patent No.: US 10,207,556 B2
(45) Date of Patent: Feb. 19, 2019

(54) AXLE UNIT

(71) Applicant: SAF-HOLLAND GmbH, Bessenbach (DE)

(72) Inventors: Armin Christ, Bessenbach (DE); Kerstin Kreiner, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 8 days.

(21) Appl. No.: 15/510,109

(22) PCT Filed: Sep. 8, 2015

(86) PCT No.: PCT/EP2015/070479
§ 371 (c)(1),
(2) Date: Mar. 9, 2017

(87) PCT Pub. No.: WO2016/038025
PCT Pub. Date: Mar. 17, 2016

(65) Prior Publication Data
US 2017/0259636 A1    Sep. 14, 2017

(30) Foreign Application Priority Data

Sep. 12, 2014 (DE) .................. 10 2014 218 331

(51) Int. Cl.
    *F16D 65/09*      (2006.01)
    *B60G 9/00*       (2006.01)
    *B60G 7/00*       (2006.01)
    *B60G 11/113*     (2006.01)
    *B60B 35/04*      (2006.01)
    (Continued)

(52) U.S. Cl.
    CPC ............ *B60G 9/003* (2013.01); *B60B 35/007* (2013.01); *B60B 35/02* (2013.01); *B60B 35/04* (2013.01);
    (Continued)

(58) Field of Classification Search
    CPC ........ B60G 9/003; B60G 7/001; B60G 7/008; B60G 2206/31; B60G 2200/31;
    (Continued)

(56) References Cited

U.S. PATENT DOCUMENTS 3,792,434 A    2/1974  Williams
4,763,710 A *  8/1988  Pielach ............... G01M 1/045
                                                157/14
(Continued)

FOREIGN PATENT DOCUMENTS

CN    103889636 B    11/2016
DE       60201750    12/2005
(Continued)

OTHER PUBLICATIONS

European Patent Office; International Search Report, dated Nov. 11, 2015.

*Primary Examiner* — Toan C To
(74) *Attorney, Agent, or Firm* — Price Heneveld LLP

(57) ABSTRACT

The present invention concerns an axle unit comprising a stub axle and an axle tube, wherein the stub axle has a longitudinal channel which extends inside the stub axle substantially along a stub axis, wherein the stub axle has a transverse channel which extends inside the stub axle substantially transversely to the stub axis and opens to the environment at the outer face of the stub axle, wherein the longitudinal channel and the transverse channel are connected together, wherein the stub axle has a stub joining region to which the hollow-bodied axle tube can be secured.

19 Claims, 4 Drawing Sheets

(51) Int. Cl.
*B60B 35/00* (2006.01)
*B60B 35/08* (2006.01)
*B60B 35/14* (2006.01)
*B60B 35/02* (2006.01)

(52) U.S. Cl.
CPC .............. *B60B 35/08* (2013.01); *B60B 35/14* (2013.01); *B60G 7/001* (2013.01); *B60G 7/008* (2013.01); *B60G 11/113* (2013.01); *B60B 2310/202* (2013.01); *B60G 2200/31* (2013.01); *B60G 2202/413* (2013.01); *B60G 2204/121* (2013.01); *B60G 2204/148* (2013.01); *B60G 2204/1482* (2013.01); *B60G 2204/201* (2013.01); *B60G 2204/4306* (2013.01); *B60G 2206/012* (2013.01); *B60G 2206/31* (2013.01)

(58) Field of Classification Search
CPC . B60G 2204/148; B60B 35/007; B60B 35/02; B60B 2310/202
USPC .................................. 280/124.116, 124.128
See application file for complete search history.

(56) References Cited

U.S. PATENT DOCUMENTS

| | | | | |
|---|---|---|---|---|
| 5,587,698 A * | 12/1996 | Genna | ................... | B60C 23/003 116/34 R |
| 5,707,463 A * | 1/1998 | Hansen | ............... | B60C 11/1612 152/208 |
| 6,024,139 A * | 2/2000 | McInnes | ............... | B60C 29/062 141/38 |
| 6,254,196 B1* | 7/2001 | Gee | ......................... | B60B 27/00 301/105.1 |
| 2003/0067133 A1* | 4/2003 | Eveley | .................... | B60G 9/02 280/124.11 |
| 2009/0230649 A1 | 9/2009 | Ziech | | |
| 2010/0225157 A1 | 9/2010 | Kirby | | |
| 2012/0067482 A1 | 3/2012 | Stech | | |
| 2012/0212039 A1 | 8/2012 | Sonzala et al. | | |
| 2013/0193659 A1* | 8/2013 | Fuks | ................... | B22D 19/0072 280/93.512 |
| 2015/0047764 A1 | 2/2015 | Tiziani et al. | | |
| 2016/0152100 A1* | 6/2016 | Berkness | ............. | B60C 23/003 301/6.5 |

FOREIGN PATENT DOCUMENTS

| | | |
|---|---|---|
| DE | 102011086481 | 5/2013 |
| DE | 102014001373 | 8/2015 |
| EP | 0130477 | 9/1985 |
| FR | 2291888 | 6/1976 |
| FR | 2547544 | 12/1984 |
| FR | 2967112 | 5/2012 |
| WO | 2007098927 | 9/2007 |
| WO | 2012015669 | 2/2012 |
| WO | 2012084912 | 6/2012 |
| WO | 2013025991 | 2/2013 |

* cited by examiner

AXLE UNIT

BACKGROUND OF THE INVENTION

The present invention concerns an axle unit and a chassis system, in particular for use in trucks.

It has been known from the prior art to mount additional motors, such as for example hydraulic single wheel drives, on axle units in the region of the wheel suspension in order for example to be able to maneuver a trailer when the tractor vehicle is detached, or for example to be able to transmit additional drive power to the individual wheels on steep gradients and/or under heavy load. In the past, a great improvement has already been achieved by integrating in the axle body of a rigid axle the lines necessary to supply the additional drive with the corresponding hydraulic fluid. In this way, already the space required for the axle unit and the space required for the entire chassis system could be reduced, and the hydraulic lines previously arranged outside the axle or axle body could be routed in the shielded areas of the chassis in which no components thrown up during travel of the truck can damage the hydraulic lines. The disadvantage of the solutions known from the prior art for axle units with integrated hydraulic lines, and chassis systems produced from these, has proved to be the particularly complex production. Furthermore, the weight of the axle units known from the prior art is very high. The object is therefore to simplify the production of axle units with integral hydraulic lines, and reduce the weight of such axle units and chassis systems with such axle units.

SUMMARY OF THE INVENTION

According to the invention, the axle unit comprises a stub axle and an axle tube, wherein the stub axle has a longitudinal channel which extends inside the stub axle substantially along a stub axis, wherein the stub axle has a transverse channel which extends inside the stub axle substantially transversely to the stub axis and opens to the environment at the outer face of the stub axle, wherein the longitudinal channel and the transverse channel are connected together, wherein the stub axle has a stub joining region to which the hollow-bodied axle tube can be secured. The axle unit comprises a stub axle which is configured at least in regions rotationally symmetrically about a stub axis, and is designed for mounting the wheel hub or the vehicle wheel of a truck so as to be rotatable. A particular feature of the stub axle is that a channel passes through it, wherein the channel is divided into a longitudinal channel which extends substantially along the stub axis, and a transverse channel which extends substantially transversely to the stub axis. Particularly preferably, the longitudinal channel is arranged parallel to the stub axis in the stub axle. Furthermore preferably, the transverse channel may be made from the outside in the stub axle parallel to a vertical to the stub axis and at its lowest point may open into the longitudinal channel. The longitudinal channel and the transverse channel are in particular preferably configured as lines for a hydraulic fluid, wherein the longitudinal channel opens preferably at the end face of the stub axle and the transverse channel opens at the preferably cylindrical outer face or casing surface of the stub axle. Apart from the longitudinal and transverse channels, the stub axle is preferably configured as a solid body, i.e. the longitudinal channel and the transverse channel, or preferably a plurality of longitudinal and transverse channels, constitute the only recesses or cavities in the stub axle. In contrast to this, the axle tube is preferably configured as a hollow body, wherein the axle tube particularly preferably extends substantially rotationally symmetrically to a tube axis and has its greatest extension along the tube axis. The axle tube can be secured or preferably is secured to the stub axle at a stub joining region thereof. The axle unit formed from the stub axle and the axle tube thus comprises a substantially solid-bodied portion and a hollow-bodied portion, wherein the total weight of the axle unit may be significantly reduced in this way in comparison with the axle systems known from the prior art. Also, the proposed solution allows a significant reduction in the production complexity, since in particular the longitudinal channel now covers less than half the length of the stub axle and is therefore easier to produce in the axle unit.

Preferably, the axle tube extends with a tube length substantially along a tube axis, wherein the stub axle extends with a stub length along the stub axis, wherein the ratio of the stub length to the tube length is 0.1 to 1.2, preferably 0.25 to 0.99, and particularly preferably 0.4 to 0.7. It has been found that the weight of the axle unit may be reduced in particular if the ratio of the stub length to the tube length is held at approximately 0.1 to 1.2. At the same time, this ratio allows room for all necessary systems such as wheel suspension, brake carriers and control arm suspension on the stub axle or in the transitional region between the stub axle and the tube unit. Experiments by the applicant have shown that, with a ratio of stub length to tube length of 0.25 to 0.99, in particular for the track widths currently demanded by manufacturers for trucks, particularly good weight values can be achieved using standard semi-finished products for the manufacture of the stub axle. It has proved advantageous here that, as far as possible, both stub axles designed for mounting of an additional drive and stub axles designed for rigid truck axles without additional drive, and hence without hydraulic line systems, may be produced from one and the same type of semi-finished product or stub axle blank. The preferred ratio of stub length to tube length of 0.25 to 0.99, according to simulations by the applicant, in particular for these requirements, allows particularly low values for the weight of the entire axle unit. For particularly heavily loaded trucks, it has proved advantageous to keep the ratio of stub length to tube length in a ratio of 0.4 to 0.7, wherein in particular the minimum value of 0.4 of the ratio of stub length to tube length provides a relatively long stub axle in comparison with the tube unit. This is because for heavily loaded trucks, such as for example heavy-duty trailers, the axle units must be as compact as possible and their stub length should be no less than 0.4 times the tube length. In order to be able to save weight in these vehicles too, it has proved advantageous if the maximum value of the stub length relative to the tube length does not lie above 0.7 in the mutual ratio of the two lengths, since in this way the hollow-bodied proportion of the axle unit is kept relatively high.

In a further preferred embodiment, the stub axle has a reinforcing portion in the region of the longitudinal channel and/or the transverse channel, which is formed from a material with higher strength than the stub axle. It is understood that the introduction of a longitudinal channel and/or a transverse channel in the stub axle reduces its overall strength. In order to keep the increase in material thickness of the stub axle, necessary because of this strength loss, in the surrounding regions as small as possible, it is preferred that a reinforcing portion is provided which is formed from a material of higher strength than the material of the stub axle. For example, a high strength steel alloy may be used here which for cost reasons is not used for production of the entire stub axle. Alternatively, preferably fiber-reinforced elements could be introduced into the stub axle and secured to this preferably by substance bonding. To further increase the service life and strength of the stub axle in particular against periodic loads, it is preferred that the transition between the longitudinal channel and the transverse channel is configured rounded in order to reduce notch effects in this region to a minimum. It is also understood here that the reinforcing portion has a rounded geometry in order preferably to prevent or reduce notch effects between the material of the reinforcing portion and the surrounding material of the stub axle.

Preferably, the reinforcing portion is cast into a recess of the stub axle, wherein the longitudinal channel and/or the transverse channel is provided inside the reinforcing portion. In other words, the reinforcing portion is configured as a hollow body, wherein its outward-facing side is attached to the material of the stub axle by substance bonding, and its inward-facing side forms a longitudinal or a transverse channel. In this context, it may be preferred that the reinforcing portion is cast into the stub axle, wherein during the casting process, a core is inserted in the corresponding bore in the stub axle in order to leave a free channel in the reinforcing portion. The advantage of this embodiment is the substance-bonded connection between the reinforcing portion and the material of the stub axle, wherein the material of the stub axle is supported particularly effectively by the stronger material of the reinforcing portion. Thus with low material use and weight, a high strength of the stub axle can be achieved.

In a further preferred embodiment, the stub axle has two, preferably at least three, and in particular preferably at least four longitudinal channels and transverse channels. To supply a hydraulic additional drive, it is advantageous that the stub axle has at least two channels, wherein one of these channels is configured as a pressure supply line and the other as a return line for the hydraulic fluid. For the drive of more complex additional motors, it may also be preferred to arrange at least three channels in the stub axle, wherein two channels may be used as pressure supply lines and a third channel as a common return line for hydraulic fluid. In a particularly preferred embodiment, a fourth channel is provided through which a heated hydraulic fluid may be conducted into the additional drive, in order to allow or accelerate the reaching of the necessary operating temperature of the hydraulic additional drive at particularly low exterior temperatures. Particularly preferably, the number of recesses or bores is adapted to the number of channels, in order in particular not to have to guide two or more lines through a recess or bore which must be made particularly large, and in this way drastically reduce the strength of the stub axle in this region. Advantageously, the recesses or bores are arranged evenly distributed over the periphery of the stub axle.

Advantageously, a first connecting portion is defined on the outer face of the stub axle, wherein the opening points of the transverse channels are arranged inside the first connecting portion, wherein the first connecting portion, starting from a vertical to the stub axis, has an arcuate extension of maximum 30° to 120°, preferably 50° to 110°, and particularly preferably approximately 85° to 100°. In other words, the connecting portion is the region of the outer face of the stub axle in which the transverse channels pass through the outer face of the stub axle or open to the environment or to hydraulic line elements connected to the transverse channels. The first connecting portion is here arranged with other elements inside a preferably straight circle cone, the tip of which lies on the stub axis or intersects the stub axis, the height of which stands perpendicular to the stub axis, and the half opening angle of which is equal to the arcuate extension. The size of the arcuate extension is thus a value for the proportion of the outer face of the stub axle over which the first connecting portion extends. In this context, it is particularly preferred that the first connecting portion has as small an extension as possible, and hence the arcuate extension as far as possible has only a small angle of preferably 30°. On the other hand, however, it is also preferred that sufficient material and hence sufficient channel wall thickness remains between the transverse channels to guarantee sufficient strength, in particular against the high pressures occurring in the hydraulic fluid. The angular range given here of 30° to 120° for the arcuate extension contains the compromises, found to be particularly suitable in the context of the present invention, between firstly as compact as possible a configuration and a small extension of the first connecting portion, and simultaneously a sufficient strength of the material webs between the transverse channels. The particularly preferred range of 50° to 110° has proved suitable in particular in relation to the possibility of the use of grey cast iron or spheroidal graphite iron to produce a stub axle with transverse channels which open into a first connecting portion of the stub axle. The particularly preferred range of 85° to 100° has particular advantages in relation to the arrangement of preferably four transverse channels and their connection to connecting elements of hydraulic lines known from the prior art, while simultaneously guaranteeing a sufficient wall thickness between the transverse channels.

In a further preferred embodiment, the first connecting portion has a first engagement means for securing a line element. The engagement means for securing a line element may preferably be a thread. This thread may particularly preferably be made in the outer wall of the transverse channel in the region of the first connecting portion. Alternatively, preferably, a protrusion with an outer thread may be provided on the first connecting portion, onto which a line element can easily be screwed to create a fluid-tight connection between the line element and the transverse channel. Particularly preferably, engagement means configured with both an inner and an outer thread may be provided in or on the reinforcing portion, wherein here in particular the high strength of the production material of the reinforcing portion is utilized and a high strength of the connection between the line element and the transverse channel can be achieved with only a low material thickness.

Furthermore, preferably, at its end face facing away from the axle tube, the stub axle has a second connecting portion with a second engagement means for connecting the longitudinal channel to an additional unit. Similarly to the configuration of the first engagement means, the second engagement means may here be an inner thread made in the material of the stub axle or the reinforcing portion. Alternatively, preferably, a preferably hollow-bodied protrusion protruding from the end face of the stub axle may be provided with an outer thread, onto which the corresponding line elements or interfaces of an additional unit, such as for example a hydraulic additional drive, may be connected. Advantageously here, sealing elements are provided in the second connecting portion which guarantee a fluid-tight connection between the longitudinal channel and the additional unit even under the high pressures to be expected in the hydraulic fluid.

In a particularly preferred embodiment, at its end facing away from the axle tube, the stub axle has a force transmission portion onto which an additional unit can be secured by form and force fit. The force transmission portion is in particular configured for connecting an additional unit to the stub axle, such that a torque may be transferred from the stub axle to the additional unit and at the same time the latter is protected against slipping or sliding off the stub axle. For this, the force transmission portion preferably has a star-shaped or sprocket-shaped or splined shaft geometry which is arranged uniformly about the stub axis. Particularly preferably, for fluidic connection of the additional unit to the longitudinal channel of the stub axle, the second connecting portion may be arranged on the end face which in this preferred case is the end face of the force transmission portion. In this way, it is possible to guarantee a particularly compact connection or particularly compact connecting region both for transmission of force and moment, and for the transfer of hydraulic fluid between the stub axle and the additional unit. Furthermore, this arrangement avoids the need for guiding further hydraulic lines to the additional unit between the hydraulic system of the truck and the additional unit outside the stub axle, where in particular they would be exposed to parts thrown up and other harmful environmental influences.

According to the invention, a chassis system is provided which comprises a stub axle and a suspension arm unit, wherein the stub axle at least in regions is configured rotationally symmetrically to a stub axis and has a first connecting portion on its outer face, wherein the suspension arm unit extends substantially along an arm axis and has an engagement portion, wherein the stub axle can be secured to the engagement portion of the suspension arm unit such that the stub axis is oriented transversely to the arm axis, wherein the engagement portion has a connecting recess which can be arranged on the first connecting portion such that the first connecting portion is accessible via the connecting recess. The chassis system preferably comprises an axle unit configured as described above and a suspension arm unit, wherein the two may be or are secured to each other in the region of an engagement portion of the suspension arm unit. The suspension arm unit is preferably the longitudinal suspension arm of a truck chassis which is connected to the frame of the truck at a first distal end so as to be pivotable, and at its second end opposite the first end is supported on a spring, such as for example an air spring. Particularly preferably, the stub axle is connected to the engagement portion of the suspension arm unit in the region of the first connecting portion. In order to still guarantee accessibility of the first connecting portion in this area, the suspension arm unit has a connecting recess in the region of the first engagement portion which is dimensioned and arranged such that line elements can pass through the connecting recess to the first connecting portion and be secured thereto. Securing the suspension arm unit to the axle unit in the region of the stub axle has the advantage that the high material strength values of the stub axle, which are present because of the configuration as a solid body despite the introduction of channels, can be utilized in order to achieve a particularly high bending strength of the chassis system. At the same time, it is advantageous that the line elements guided to the first connecting portion of the stub axle are arranged and secured in the region of the suspension arm unit, so that no lines need be left hanging freely and unprotected in the region of the chassis. In this context, in particular, it is possible to route the hydraulic lines from the region of the pivotable suspension of the suspension arm unit, along the suspension arm unit as far as the engagement portion with the connecting recess, wherein the hydraulic lines may be fixed to the suspension arm unit and in particular to the portion of the suspension arm unit configured as a longitudinal suspension arm. Because the hydraulic lines are arranged on the top of the longitudinal suspension arm of the suspension arm unit, they are also protected from elements thrown up from below, such as for example stones, and as a whole the safety and service life of the hydraulic system of the chassis system may be increased.

In a preferred embodiment, the engagement portion comprises two webs which are spaced apart from each other and surround the stub axle in regions, wherein the connecting recess is arranged between the webs. Particularly preferably, the webs of the suspension arm unit may be configured as U-shaped brackets which, in the known fashion, are bolted for example to a leaf spring or to a longitudinal suspension arm of a truck. Alternatively, preferably, the webs may also be regions of a longitudinal suspension arm formed integrally or as one piece. Here, the webs preferably have a material thickness which allows compensation for the weakening of the material of the suspension arm unit caused by the connecting recess. To avoid notch effects, it is preferred that the transitional regions between the webs and the connecting recess each be radiused, so that a particularly favorable flow of forces and moments may be achieved in the region of the webs and the connecting recess.

Particularly preferably, the connecting recess and the first connecting portion have the same extension along the stub axis and are preferably substantially congruent. In order to keep the weakening of the material of the engagement portion of the suspension arm unit caused by the connecting recess as low as possible, it is preferred that the extension of the connecting recess is as small as possible. At the same time, it must be guaranteed that the connecting recess allows access to the first connecting portion of the stub axle. In this context, it is preferred that at least the extensions along the stub axis of both the connecting recess and the first connecting portion are substantially the same. In this way, firstly a precise attachment position of the suspension arm unit on the stub axle may be defined, and at the same time the suspension arm unit may be configured as compactly as possible due to the relatively low weakening of the material by the connecting recess, so that the weight of the chassis system is reduced. In a particularly preferred embodiment, the connecting recess and the first connecting portion are substantially congruent, i.e. in assembled state between the suspension arm unit and stub axle, the connecting recess is no larger than the first connecting portion.

Particularly preferably, adjacent to the first connecting portion, the stub axle has a stub joining region onto which an axle tube may be secured. The axle tube is particularly preferably a hollow-bodied, in particular preferably a tubular body, and particularly preferably is secured to the stub joining region of the stub axle by means of a welding process. Due to the combination of the stub axle configured as a solid body and an axle tube configured as a hollow body, particularly preferably the weight of the chassis system may be kept low, wherein simultaneously the function of the integral hydraulic lines is retained and the interfaces between the hydraulic line system and the integral hydraulic lines are favorably arranged in the region of the first connecting portion. Preferably, the attachment area is arranged adjacent to the first connecting portion, since in this way the length of the stub axle can be kept as short as possible. Particularly preferably, the stub joining region has a portion configured as a rebate, onto which the axle tube can be pushed. In this way, in addition to the weld connection preferably formed between the stub axle and the axle tube, bending moments can be transmitted with a lever arm which is equal to the overlap length between the stub axle and the axle tube.

Further advantages and features of the present invention arise from the following description of preferred embodiments in relation to the attached figures. It is understood that in the context of the present invention, features of individual embodiments may also be applied in other embodiments, unless this is explicitly excluded or prevented for technical reasons.

DETAILED DESCRIPTION OF THE PREFERRED EMBODIMENTS

Figure 1:
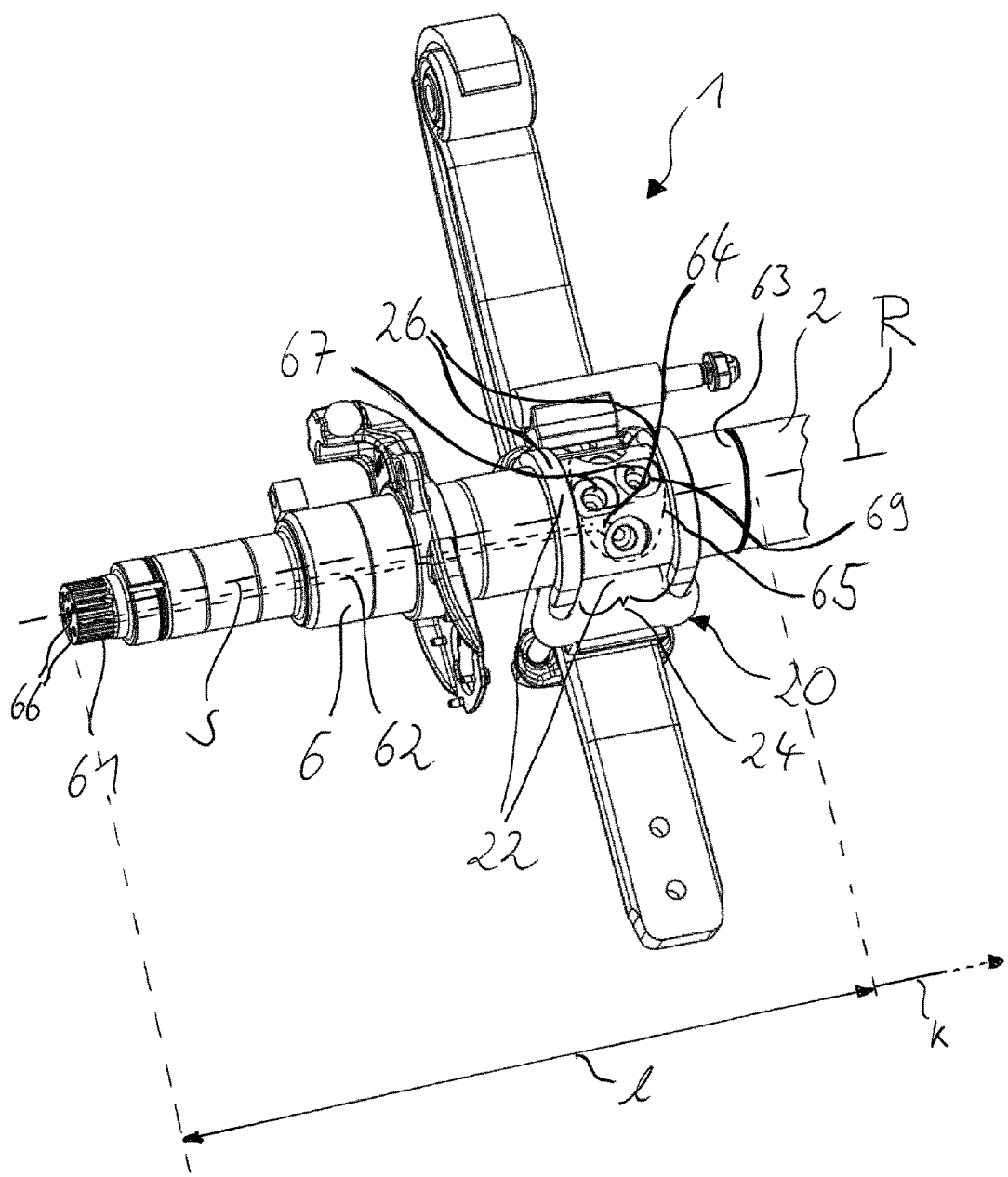
FIG. 1 a perspective view of a preferred embodiment of the chassis system according to the invention.
Figure 5:
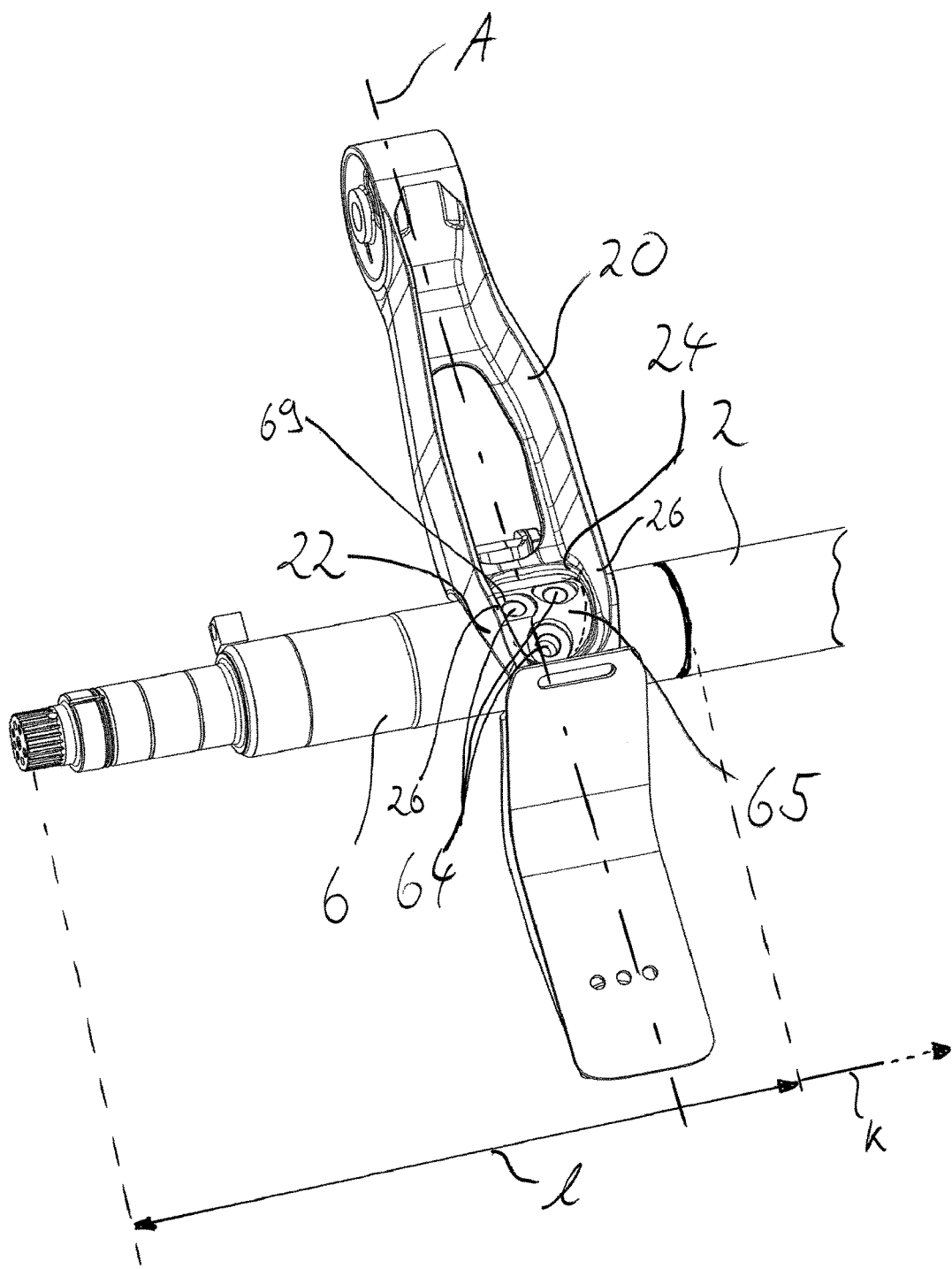
FIG. 5 a perspective view of a preferred embodiment of the chassis system according to the invention.

In the preferred embodiment of FIG. 1, the chassis system 1 comprises a stub axle 6, a suspension arm unit 20 and an axle tube 2 which is preferably secured to the stub axle 6. The stub axle 6 extends substantially along a stub axis S and at least in regions is configured rotationally symmetrically to this stub axis S. The rotationally symmetrical configuration of the stub axle 6 here relates in particular to its outer faces, since preferably at least one longitudinal channel 62 and at least one transverse channel 64 are provided in the interior of the stub axle 6, constituting a deviation from the rotational symmetry. The figure shows (in dotted lines) only one of the longitudinal channels 62 arranged in the stub axle 6. At its end facing away from the axle tube 2 and shown on the left in the figure, the stub axle 6 has a force transmission portion 61. The force transmission portion 61 serves to secure an additional unit (not shown) and to transfer a moment from the additional unit to the stub axle 6. Furthermore, on the end face of the stub axle 6 shown on the left in the figure, at least one second connecting portion 66 is provided which serves to connect fluid-tightly corresponding hydraulic lines of the additional unit to the longitudinal channel 62 or to the plurality of longitudinal channels 62. The stub axle 6 furthermore has a first connecting portion 65 which is preferably arranged on the surface or outer casing surface of the stub axle 6, and particularly preferably is the region in which the transverse channels 64 emerge from the stub axle 6. In their opening region on the casing surface of the stub axle 6, the transverse channels 64 are preferably provided with a reinforcing portion 69. Instead of an integrally configured longitudinal suspension arm or suspension arm unit 20 as shown in FIG. 5, a multipiece longitudinal suspension arm is provided. The webs 26 of the suspension arm unit 20 are here configured preferably as U-shaped brackets which are clamped against the stub axle 6 against a carrier arm configured as a spring element. The suspension arm unit 20 is secured to the stub axle with its engagement portion 22, wherein the figure shows only the upper part or the part of the engagement portion 22 pointing towards the observer. In the region of the engagement portion 22, the suspension arm unit 20 preferably has a connecting recess 24, which in particular guarantees the accessibility of the first connecting portion 65 of the stub axle 6. Adjacent to the first connecting portion 65 and hence preferably to the connecting region between the suspension arm unit 20 and the stub axle 6, the stub axle has a stub joining region 63. The axle tube 2 is preferably secured to the stub joining region 63. Here, preferably, an overlap region is provided between the axle tube 2 and the stub joining region 63 which serves to transmit additional bending and torsion moments between the axle tube 2 and the stub axle 6. Preferably, in the region of the engagement portion 22, the suspension arm unit 20 has two webs 26, between which the connecting recess 24 is arranged. The webs 26 here in particular allow a geometry of the suspension arm unit 20 which is optimized for force flow at low stress peaks, in order to be able to transmit the corresponding bending moments in the region of the engagement portion 22. On the underside of the suspension arm unit 20 shown in the figure, a receiving region for an air spring is depicted diagrammatically.

Figure 2:
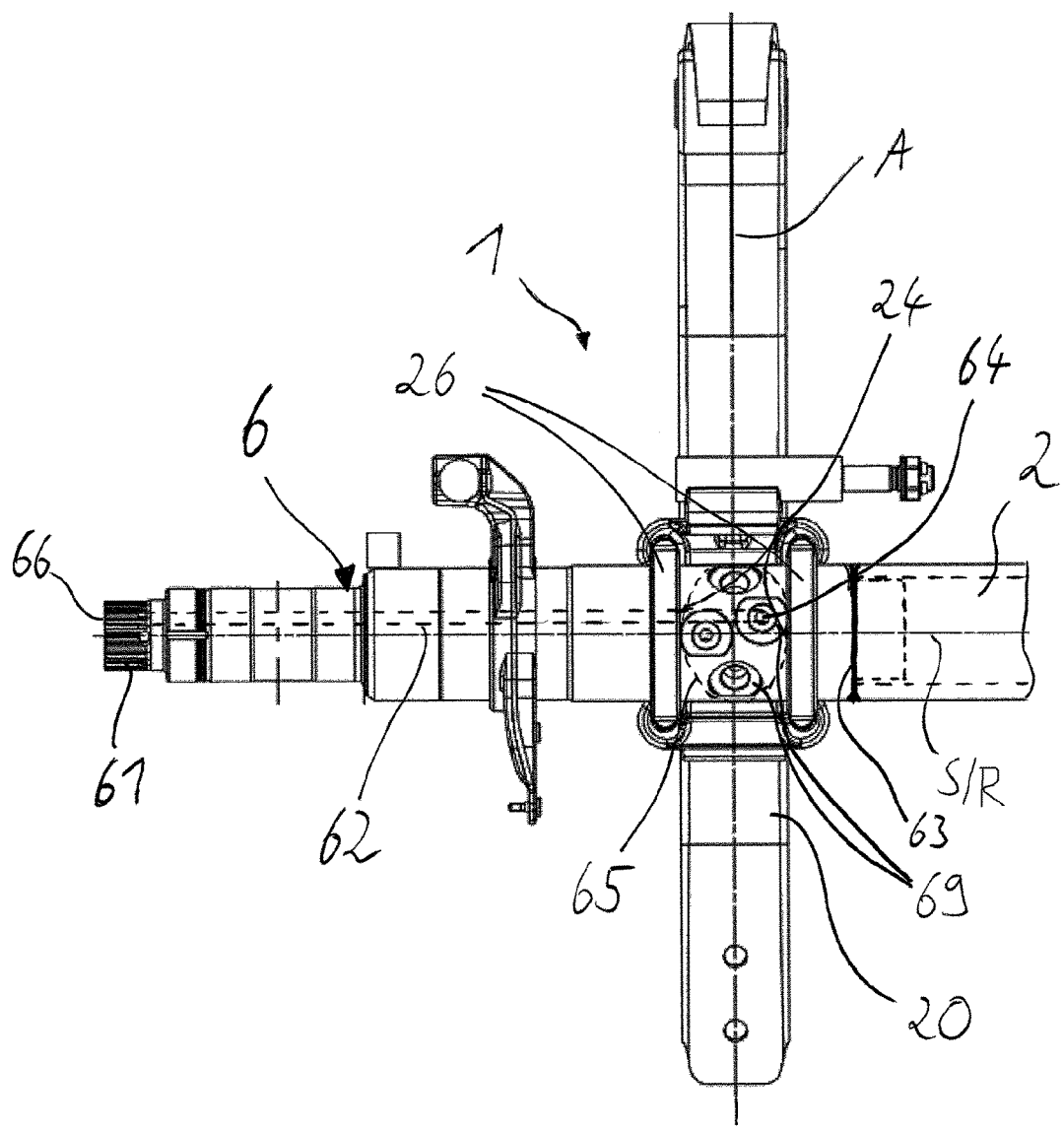
FIG. 2; a top view of the preferred embodiment of the chassis system according to the invention shown in FIG. 1.

FIG. 2 shows a top view of the preferred embodiment of FIG. 1. The preferred extension of the connecting recess 24 and the connecting portion 65 accessible through this (shown in dotted lines) can be seen. Furthermore, the arm axis A, along which the suspension arm unit 20 mainly extends, is depicted. Preferably, the web elements 26 delimit the connecting recess 24 in a direction running parallel to the stub axis S. Furthermore, a preferred configuration of the stub joining region 63 is shown, which is configured to overlap with the axle tube 2 at least in regions. The axle tube 2 and the stub axle 6 are preferably joined by substance bonding by means of a welding process. Here, the best strength values result for the connection between the stub axle 6 and the axle tube 2. A friction welding process is used for preference, particularly preferably a rotational friction welding process, since this creates a particularly strong material joint. In the case where the possibility of subsequent separation of the connection between the stub axle 6 and the axle tube 2 should be retained, in particular for maintenance-intensive vehicles, an arc welding process may also be used to connect the stub axle tube 6 to the axle tube 2.

Figure 3:
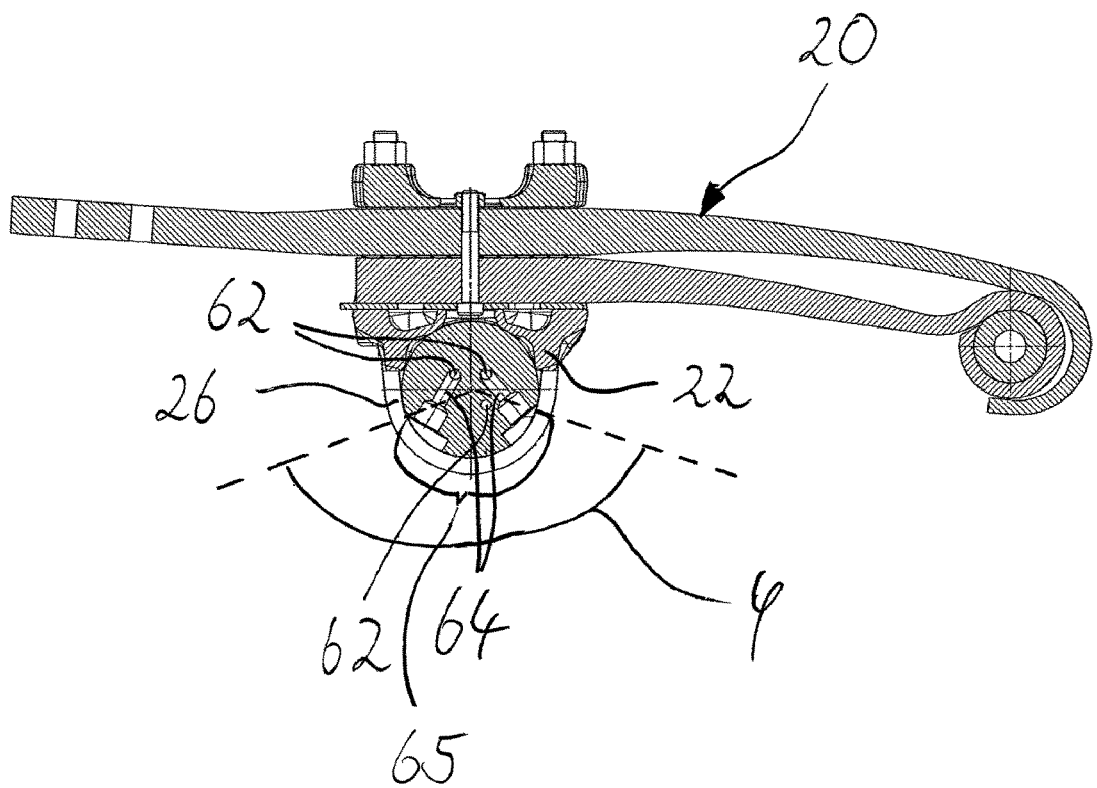
FIG. 3; a further section view of the embodiment of the chassis system shown in FIGS. 1 and 2.

FIG. 3 shows a section view of the preferred embodiment of FIGS. 1 and 2. Here the course of the transverse channels 64 in the stub axle 6 is illustrated. The two transverse channels 64 shown cut in this section plane are each connected fluid-tightly to a longitudinal channel 62 running substantially parallel to the stub axis S, and open at the outer face of the stub axle 6 in the connecting portion 65. In their opening region, the transverse channels 64 have engagement means for attaching a fluid line or pipe, via which preferably hydraulic fluid may be introduced into the stub axle 6 and discharged from this again. The connecting portion 65 preferably has a maximum extension along the circumference of the outer face of the stub axle 6 with an arcuate extension $\phi$. The arcuate extension $\phi$ is preferably an arcuate angle and is measured in a plane which stands perpendicular to the stub axis S.

Figure 4:
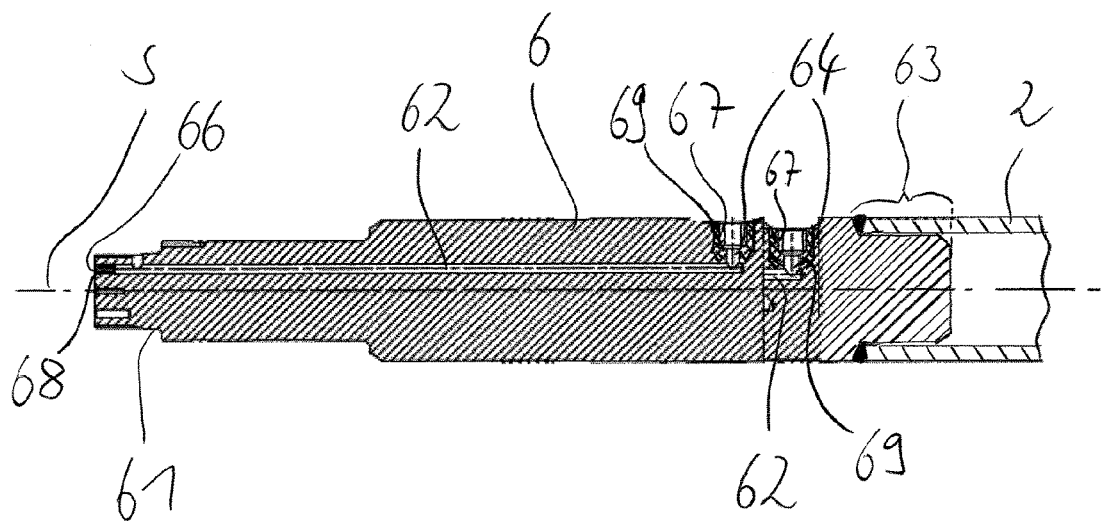
FIG. 4 a section view of a preferred embodiment of the axle unit according to the invention.

FIG. 4 shows a section view of a preferred embodiment of the stub axle 6 according to the invention. The transverse channel 64 shown on the right of the two is depicted in a lower section plane than the left transverse channel 64. This illustrates the arrangement of the longitudinal channels 62 and transverse channels 64 at different depths, viewed by the observer, in the stub axle 6. The longitudinal channel 62 extends between a second connecting portion 66, parallel to the stub axis S, up to its transition into the transverse channel 64. In the first connecting portion 65, the transverse channel has a first engagement means 67 via which a line element (not shown) may be attached. Particularly preferably, the first engagement means 67 is made in the reinforcing portion 69 which is preferably provided on the transverse channel 64. A releasable connection between the transverse channel 64 and a line element has proved advantageous, wherein preferably a thread, particularly preferably a self-locking and self-sealing thread is used. At the second connecting portion 66, the longitudinal channel 62 preferably has a second engagement means 68 which is configured advantageously as a thread, similar to the first engagement means 67. Alternatively, the first engagement means 67 and/or the second engagement means 68 may also be configured as form-fit engagement mechanisms, or advantageously have a bayonet catch, in order to achieve as simple an installation of the hydraulic lines as possible. At its end opposite the second connecting portion 66 and the force transfer portion 61, the stub axle 6 has a stub joining region 63 via which the axle tube 2 may be secured to the stub axle 6, preferably both by form fit via an overlap and by substance bonding via a weld connection.

FIG. 5 shows a perspective view of a further preferred embodiment of the chassis system according to the invention. The suspension arm unit 20 is here secured to the stub axle 6 in its engagement portion 22. In the region of the first connecting portion 65 of the stub axle 6, the suspension arm unit 20 has a connecting recess 24 which allows access to the corresponding transverse channels 64 in the region of the first connecting portion 65. Furthermore, the figure clearly shows the reinforcing portions 69 which support the strength of the respective transverse channels 64. Preferably, the length of the stub axle 6 between the first connecting portion 65 and the force transmission portion 61, shown on the left in the figure, is configured such that sufficient space is available for mounting of a wheel bearing and for attaching further elements, such as for example a brake carrier as indicated in FIGS. 1 and 2. In the context of the present invention, it is preferred to keep the stub length l as short as possible in order to reduce the weight of the axle unit, but at the same time the stub length l must be large enough to guarantee accordingly sufficient installation space for mounting the wheel suspension and further peripheral systems, such as for example a brake carrier. These requirements lead to a preferred ratio range of the stub length l to the tube length k of 0.1 to 1.2. In contrast to the embodiment of the chassis system shown in FIGS. 1 and 2, the suspension arm unit 20 in FIG. 5 is preferably configured as a casting optimized for force flow, and particularly preferably integrally.

LIST OF REFERENCE NUMERALS

1 Chassis system
2 Axle tube
6 Stub axle
20 Suspension arm unit
22 Engagement portion
24 Connecting recess
26 Web
61 Force transmission portion
62 Longitudinal channel
63 Stub joining region
64 Transverse channel
65 First connecting portion
66 Second connecting portion
67 First engagement means
68 Second engagement means
69 Reinforcing portion
φ Arcuate extension
A Arm axis
k Tube length
l Stub length
R Tube axis
S Stub axis

The invention claimed is:

1. An axle unit, comprising:
a stub axle; and
a hollow-bodies axle tube;
wherein the stub axle has two longitudinal channels which extend inside the stub axle substantially along a stub axis;
wherein the stub axle has two transverse channels which extend inside the stub axle substantially transversely to the stub axis and open to the environment at an outer face of the stub axle;
wherein in each case, one of the longitudinal channels and one of the transverse channels are connected together;
wherein the stub axle has a stub joining region onto which the hollow-bodied axle tube is directly secured;
wherein a first connecting portion is located on the outer face of the stub axle;
wherein the transverse channels include opening points that are arranged inside the first connecting portion; and
wherein the first connecting portion, starting from a vertical to the stub axis, has an arcuate extension of maximum 30° to 120°.

2. The axle unit as claimed in claim 1, wherein the axle tube extends with a tube length substantially along a tube axis, wherein the stub axle extends with a stub length substantially along the stub axis, and wherein a ratio of the stub length to the tube length is 0.1 to 1.2.

3. The axle unit as claimed in claim 2, wherein the ratio of the stub length to the tube length is 0.25 to 0.99.

4. The axle unit as claimed in claim 3, wherein the ratio of the stub length to the tube length is 0.4 to 0.7.

5. The axle unit as claimed in claim 1, wherein the stub axle has a reinforcing portion in at least one of the region of the longitudinal channel and the transverse channel, wherein the reinforcing portion comprises a material with higher strength than the stub axle.

6. The axle unit as claimed in claim 1, wherein the reinforcing portion is cast into a recess of the stub axle, and wherein at least one of the longitudinal channel and the transverse channel is provided inside the reinforcing portion.

7. The axle unit as claimed in claim 1, wherein the two longitudinal channels are two of three longitudinal channels, and wherein the two transverse channels are two of three transverse channels.

8. The axle unit as claimed in claim 7, wherein the two longitudinal channels are two of four longitudinal channels, and wherein the two transverse channels are two of four transverse channels.

9. The axle unit as claimed in claim 7, wherein the first connecting portion has a first engagement means configured to secure a line element.

10. The axle unit as claimed in claim 1, wherein the first connecting portion, has an arcuate extension of maximum 50° to 110°.

11. The axle unit as claimed in claim 10, wherein the first connecting portion, has an arcuate extension of maximum 85° to 100°.

12. The axle unit as claimed in claim 1, wherein at an end face of the stub axle facing away from the axle tube, the stub axle has a second connecting portion with a second engagement means configured to connect the longitudinal channel to an additional unit.

13. The axle unit as claimed in claim 1, wherein at an end of the stub axle facing away from the axle tube, the stub axle has a force transmission portion onto which an additional unit can be secured by at least one of a form fit and a force fit.

14. A chassis system, comprising:
an axle unit; and
a suspension arm unit;
wherein the axle unit has a stub axle;
wherein the stub axle at least in regions is configured rotationally symmetrical to a stub axis and has a first connecting portion on an outer face of the axle stub;
wherein the suspension arm unit extends substantially along an arm axis and has an engagement portion;
wherein the stub axle is configured to be secured to the engagement portion of the suspension arm unit such that the stub axis is oriented transversely to the arm axis;
wherein the connecting portion is connected to channels of the stub axle and is configured for connection of line elements;
wherein the engagement portion has a connecting recess which is configured to be arranged on the first connecting portion such that the first connecting portion is accessible via the connecting recess; and
wherein the suspension arm unit is secured to the axle unit in the region of the first connecting portion.

15. The chassis system as claimed in claim 14, wherein the engagement portion comprises two webs which are spaced apart from each other and surround the stub axle in regions, and wherein the connecting recess is arranged between the webs.

16. The chassis system as claimed in claim 15, wherein the connecting recess and the connecting portion have the same extension along the stub axis and are preferably substantially congruent.

17. The chassis system as claimed in claim 16, wherein adjacent to the connecting portion, the stub axle has a stub joining region onto which an axle tube can be secured.

18. The chassis system as claimed in claim 14, wherein the connecting recess and the connecting portion have the same extension along the stub axis and are preferably substantially congruent.

19. The chassis system as claimed in claim 14, wherein adjacent to the connecting portion, the stub axle has a stub joining region onto which an axle tube can be secured.

* * * * *